United States Patent Office 3,369,635
Patented Feb. 20, 1968

3,369,635
VEHICLE ANTI-SKID BRAKING SYSTEM
John Walter Davis, Balsall Common, Coventry, England, assignor to Dunlop Rubber Company Limited, Erdington, England, a corporation of Great Britain
Filed Aug. 20, 1965, Ser. No. 481,197
Claims priority, application Great Britain, Aug. 26, 1964, 34,859/64
9 Claims. (Cl. 188—181)

ABSTRACT OF THE DISCLOSURE

A friction member, supported on a nonrotatable member, is capable of limited angular movement with an opposed rotatable member during braking. Such movement is opposed by a spring or other resilient member, and during a skid condition when the wiping action of the rotatable member upon the friction member is insufficient to overcome the spring force, then the spring moves the friction member in a direction operating a valve which controls the application of the brake, thereby relieving the brake applying pressure during skidding and allowing the braking pressure to be restored when brake skidding has creased.

---

The present invention relates to a vehicle anti-skid braking system, particularly, but not exclusively, for road vehicles, and to a brake for such a system.

When braking pressure is applied to the brakes of a moving vehicle having pneumatic tires the braking torque produced on each wheel increases with increasing braking pressure up to a maximum value which corresponds to the maximum torque that the tire-to-ground coefficient of friction can withstand. If the braking pressure applied is in excess of this value, then the tire contact area will begin to slide or skid relative to the ground and the wheel will rapidly lose speed until the point is reach when it locks, and stop rotating.

The object of the present invention is to provide means for releasing a brake when wheel locking occurs.

According to the invention a brake comprises a rotatable member, a nonrotatable support, a friction member engageable with the rotatable member and capable of limited movement relative to the nonrotatable support under a drag force exerted thereon by the rotatable member, a fluid pressure operated brake-applying mechanism for forcing the friction member into engagement with the rotatable member, and control means for controlling the pressure of fluid in the brake-applying mechanism, the control means comprising a valve for controlling the supply of fluid to the brake-applying mechanism, and resilient means arranged to provide a force acting on the friction member to oppose the drag force exerted on the friction member by the rotatable member during braking in the normal forward direction of motion of an associated vehicle, the valve being arranged to interrupt or reduce the supply of fluid pressure to the brake-applying mechanism when the effective force exerted by the resilient means exceeds the drag force.

The drag force which is set up when the friction member of a brake is pressed into engagement with the rotatable member of the brake tends to move the friction member and its supporting structure around with the rotation of the braked member. This drag force is proportional to the torque produced by the brake, and it therefore follows that the drag force will increase with the braking pressure applied, up to the point where the braking torque reaches its maximum value for the existing tire-to-ground coefficient of friction to withstand. As the tire begins to slide the wheel locks and the drag force falls. The brake defined in the preceding paragraph uses this effect to provide means for releasing the brake.

Figure 1:
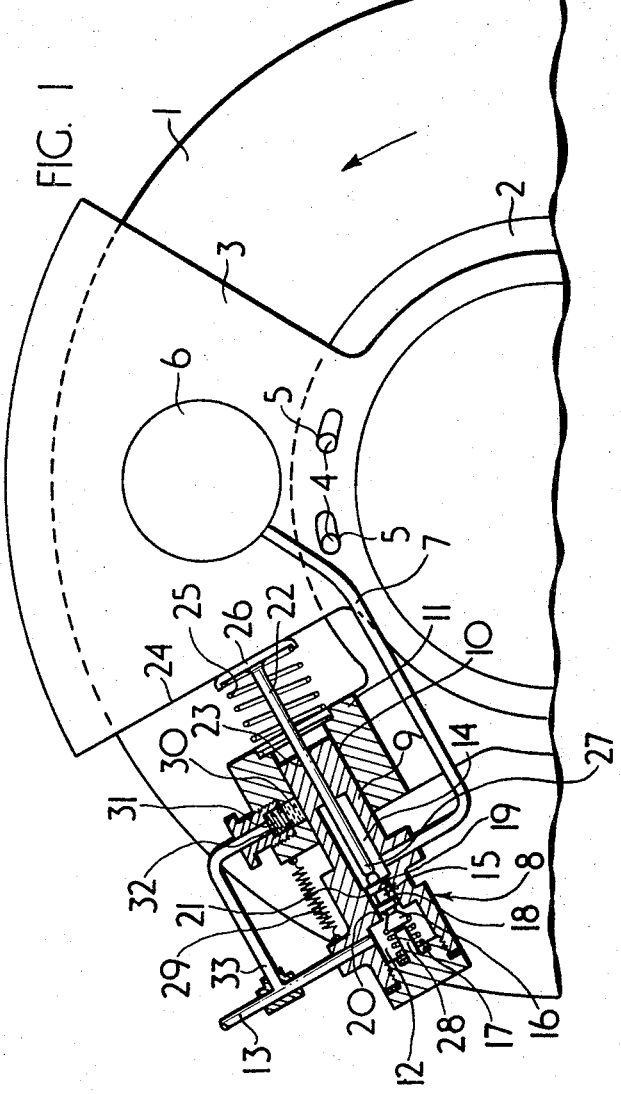
Figure 2:
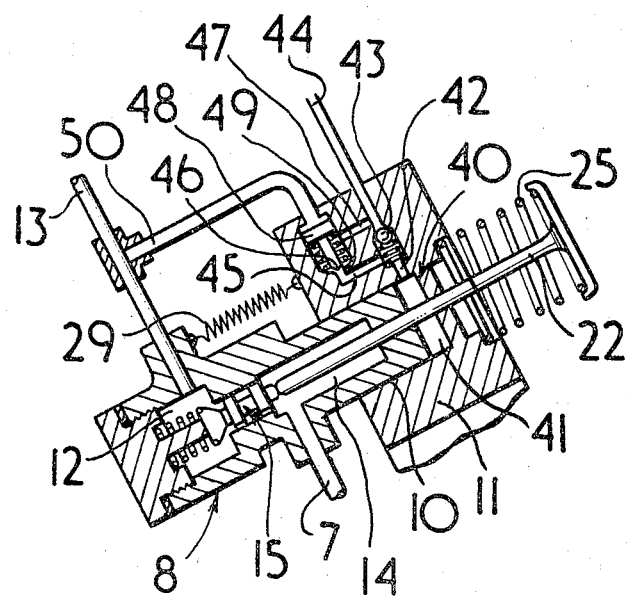

One embodiment of the invention will now be described with reference to the accompanying drawings, in which:

FIGURE 1 is a partly cross-sectional diagrammatic view of a disc brake, viewed in the axial direction, and FIGURE 2 is a partial cross-sectional view showing a modification to the brake shown in FIGURE 1.

The disc brake shown in the drawing comprises a rotatable braking disc 1 and a nonrotatable support 2. A disc brake caliper-type housing 3 straddles the outer periphery of the disc and is mounted on the supported 2 so as to be rotatable about the axis of the disc through an angular distance which is limited by the engagement of pins 4, attached to the support, with the ends of slots 5 formed in the housing.

A hydraulic brake-applying mechanism 6 is mounted on the housing 3 and is supplied with operating pressure through a flexible pipe 7. The pipe 7 is connected to a control valve body 8 mounted on the nonrotatable support 2, a cylindrical portion 9 of the valve body being slidable within a bore 10 of a nonrotatable housing 11 formed integrally with the support 2.

The valve body 8 comprises a supply chamber 12 which is arranged to be connected by a conduit 13 to a source of hydraulic pressure, such as a driver's master cylinder, and a control chamber 14 to which the flexible pipe 7 is connected. A valve member 15 is provided to control the communication between the two chambers 12 and 14, the valve member having a head 16 which is urged by a return spring 17 towards engagement with a seat formed at the end of a bore 18 joining the two chambers. The valve member has a stem 19 which is slidable in the bore 18 and has flanges 20 and 21 which are fluted to provide a free flow of fluid through the bore 18 when the valve is open.

A plunger 22 is slidable in a bore 23 of the valve body and is urged into engagement with the trailing edge 24 of the brake housing 3 by a compression spring 25 located between the nonrotatable housing 11 and a head 26 formed on the plunger 22. The other end 27 of the plunger 22 is engageable with the valve member 15, and in the released state of the brake, as shown in the drawing, is arranged to hold the valve member off its seat and against a stop 28 to provide free communication between the source of brake operating pressure and the brake-applying mechanism. The valve body 8 is urged towards the brake housing 3 by a tension spring 29, and in the released state of the brake the housing 3 is help against the stops constituted by the slots 5 and pins 4 in the position shown in the drawing, the thrust from the spring 29 being transmitted to the housing 3 through the stop 28 formed in the valve body 8, the valve member 15, and the plunger 22.

A cylindrical block of friction material 30 is fluid-tightly slidable in a hydraulic cylinder 32 formed in the wall of the bore 10, and is urged into light frictional engagement with the valve body 8 by a compression spring 32. A conduit 33 connects the cylinder 31 to the conduit 13.

In operation, fluid pressure is supplied to the brake through the conduit 13, supply chamber 12, control chamber 14, and flexible pipe 7. The resulting frictional drag exerted by the rotating disc 1 on the friction pads of the brake moves the housing the direction of the arrow, and the trailing edge 24 is pressed against the head 26 of the plunger 22.

The thrust exerted on the plunger 22 by the housing tends to move the valve body 8, after head 16 has engaged stop 28 formed in the valve body 8, and is opposed by the compression spring 25 and also by the tension in the spring 29 and the frictional resistance of the block 30 which is pressed against the valve body by the spring 32 and by the hydraulic pressure supplied to the chamber 31 through conduit 33 when the brake is operated. The thrust exerted by the spring 29, and the frictional resistance from the block 30, are small in comparison with the brake drag and the main resistance to the movement of the housing 3 is provided by the compression spring 25. The extent to which the spring 25 is compressed is therefore a measure of the torque reactions acting on the brake housing 3, and the valve body 8 is moved through a corresponding distance by the plunger 22.

If the pressure applied to the brake reaches a level which produces a braking torque which is too great for the tire-to-ground coefficient of friction to support, the torque reaction on the housing 3 will be reduced as the wheel locks. The spring 25 will then move the housing 3 and the plunger 22 in the opposite direction to the direction of rotation of the disc. Provided that the driver does not release the brakes, the conduit 13 is still supplied with fluid pressure which continues to force the friction block 30 against the valve body, acting as a locking device to hold the body in position while the plunger is withdrawn. The valve member 15 then closes on its seat to prevent communication between the supply chamber 12 and the control chamber 14, isolating the brake from the source of fluid pressure.

With the valve closed, the control chamber 14 and the brake-applying mechanism 6 form a closed hydraulic system, and further movement of the plunger 22 outwardly from the control chamber will effectively increase the volume of the chamber and reduce the pressure supplied to the brake-applying mechanism 6. This reduction in pressure will continue until the housing has moved sufficiently for a balance to be achieved between the resultant thrust on the housing 3 acting through the plunger, and the drag force. At this point the braking torque will have been reduced sufficiently to overcome the tendency for the tire to skid.

The valve body 8 will be prevented by the friction block 30 from returning to the position shown in the drawing until the pressure in the conduits 13 and 33 is relieved, on release of the brakes by the driver. The release of the pressure from the cylinder 31 reduces the friction exerted by the block 30 on the valve body 8 sufficiently to enable the spring 29 to move the valve body to the position shown in the drawing, with the valve member 15 in the open position.

FIGURE 2 shows an alternative hydraulic locking device 40 for preventing the valve body 8 from following the plunger 22 on withdrawal of the plunger, the device 40 replacing the friction clamp (30, 31) described above.

The device 40 comprises a locking chamber 41 formed at the end of the bore 10. The plunger 22 is fluid-tightly slidable through holes in the end walls of the chamber 41, and the chamber is filled with hydraulic fluid through a passage 42, a non-return valve 43, and a pipe 44 connected to a fluid reservoir (not shown). The arrangement is such that as the valve body 8 is moved by the plunger 22 fluid can enter the chamber 41 through the non-return valve.

A by-pass line for the non-return valve comprises a passage 45, a valve 46 and a passage 47. The valve 46 comprises a plunger 48 which is movable against a return spring into engagement with a valve seat 49 by hydraulic pressure supplied through a conduit 50 when the brake is operated.

In operation of the modified brake as shown in FIGURE 2, the valve body 8 is moved by the plunger 22 as described above and fluid is drawn into the chamber 41 through the non-return valve 43. The valve 46 is closed by the pressure supplied to conduit 13 to operate the brake and conveyed to the plunger 48 by the conduit 50. When the associated wheel locks and the plunger 22 is withdrawn the valve body is prevented from following the plunger since the fluid in the chamber 41 cannot escape while the valve 46 remains closed. As in the first embodiment, the valve body is allowed to move again when the brake operating pressure in conduit 13 is released, the valve 46 opening to allow the fluid in the chamber 41 to escape through the by-pass line to the reservoir.

A brake in accordance with the invention may be operated by fluid pressure, either hydraulic or pneumatic, derived from engine-driven pump, or compressor. In a pneumatic pressure operated braking system, the movement of the housing may be arranged first to isolate the brake operating mechanism from the source of pressure, and then to open an exhaust port to permit the pressure within the operating mechanism to escape to atmosphere.

A brake according to the invention may be provided on each wheel of a vehicle. Alternatively, only one such brake may be employed, in association with one wheel, the control means of this brake being incorporated in the supply line to the other brakes so that locking of the one wheel will reduce the brake operating pressure of the brakes associated with all the wheels of the vehicle.

Although the present invention has been illustrated and described in connection with selected example embodiments, it will be understood that these are illustrative of the invention and are by no means restrictive thereof. It is reasonable to be presumed, that those skilled in the art can make numerous revision and adaptations of the invention to suitable individual design requirements and it is intended that such revisions and variations of the invention which incorporate the herein disclosed principles, will be included within the scope of the following claims as equivalents of the invention.

Having now described my invention, what I claim is:

1. In a brake including a rotatable member, the structure comprising a nonrotatable support, a friction member engageable with said rotatable member and adapted for limited movement relatively to the nonrotatable support under a drag force exerted thereon by said rotatable member, a fluid pressure operated brake-applying mechanism for forcing the friction member into engagement with the rotatable member, control means for controlling the pressure of fluid in the brake-applying mechanism and comprising a valve for controlling the supply of fluid to the brake-applying mechanism, resilient means acting on the friction member to oppose the drag force exerted on the friction member of the rotatable member during braking in the normal forward direction of motion of an associated vehicle, said valve being arranged to interrupt or reduce the supply of fluid pressure to the brake-applying mechanism when the effective force exerted by the resilient means exceeds the drag force, a valve valve body forming a part of said control means and mounted on said nonrotatable support, said valve body having a supply chamber for connection to a source of hydraulic pressure and a control chamber connected to the brake-applying mechanism, a valve member located to control communication between said supply chamber and said control chamber, said valve body being mounted so as to be movable in the normal direction of rotation of the rotatable member for forward movement of an associate vehicle, a plunger operatively connected between said friction member and valve body to effect such movement of said valve body, spring means provided to urge said valve body in a direction opposite to the normal direction of rotation to the rotatable member, and a locking device for holding said valve body in position when said plunger is withdrawn.

2. A brake according to claim 1 wherein the locking device comprises a friction device arranged to be hydraulically operated by pressure supplied to the brake from an associated source of brake operating pressure.

3. A brake according to claim 2 wherein the friction device comprises a friction block slidable in a cylinder formed in the wall of a bore of the non-rotatable support, the valve body being slidable in the said bore under the thrust exerted thereon by the plunger when the brake is applied.

4. A brake according to claim 1 wherein the locking device comprises a hydraulic locking mechanism arranged to be maintained in operation by pressure supplied to the brake from an associated source of brake operating pressure.

5. A brake according to claim 4 wherein the valve body is slidable in a bore of the non-rotatable support, the hydraulic locking mechanism comprising a locking chamber formed at the end of said bore adjacent the friction member, means for supplying hydraulic fluid from a fluid reservoir to said locking chamber as the valve body is moved by the plunger, and means controlled by pressure supplied to the brake from an associated source of brake operating pressure for preventing the return of the fluid from the locking chamber to the reservoir when the plunger is withdrawn, so that the fluid contained in the locking chamber prevents the valve body from following the plunger on withdrawal thereof.

6. A brake according to claim 4 wherein the means for preventing return of the fluid from the locking chamber to the reservoir comprises a non-return valve, a by-pass line being provided for the non-return valve, the by-pass line comprising a valve which is arranged to be closed when pressure is supplied to the brake from an associated source of brake operating pressure.

7. A brake according to claim 1 wherein withdrawal of the plunger from the valve body first causes the valve to close and then effectively increases the volume of the control chamber.

8. A disc brake according to claim 1 comprising a rotatable disc and a caliper-type brake housing mounted so as to be rotatable about the axis of the disc through a limited distance, the resilient means being positioned between the brake housing and a non-rotatable support.

9. A disc brake according to claim 8 wherein the control means comprises a plunger operatively associated at one end with the valve and at the other end with the brake housing.

References Cited
UNITED STATES PATENTS 2,781,871   2/1957   Alterkruse _____ 188—181 X DUANE A. REGER, *Primary Examiner.*

UNITED STATES PATENT OFFICE
CERTIFICATE OF CORRECTION

Patent No. 3,369,635  February 20, 1968

John Walter Davis

It is certified that error appears in the above identified patent and that said Letters Patent are hereby corrected as shown below:

Column 1, line 39, "reach" should read -- reached --; line 40, "stop" should read -- stops --. Column 2, line 12, "supported" should read -- support --; line 49, "help" should read -- held --; line 56, "32" should read -- 31 --; line 65, after "housing" insert -- in --. Column 4, line 28, "suitable" should read -- suit --; line 46, "of" should read -- by --; line 52, cancel "valve".

Signed and sealed this 29th day of July 1969.

(SEAL)
Attest:

Edward M. Fletcher, Jr.  WILLIAM E. SCHUYLER, JR.
Attesting Officer  Commissioner of Patents